Jan. 27, 1925. 1,524,025
F. DIEHL
MOTOR TERMINAL BLOCK
Filed May 12, 1920
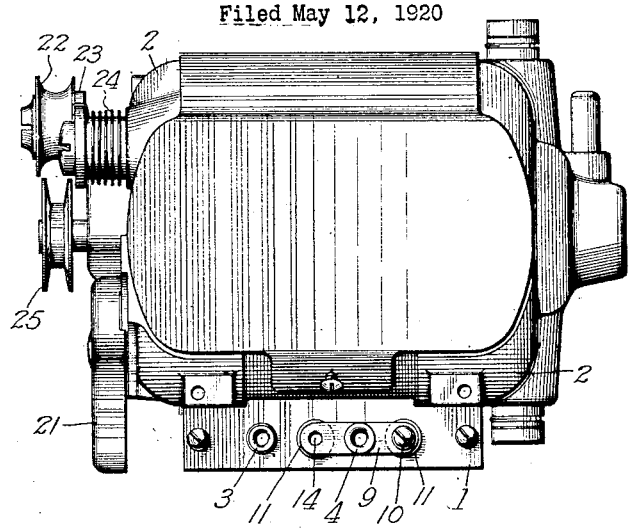
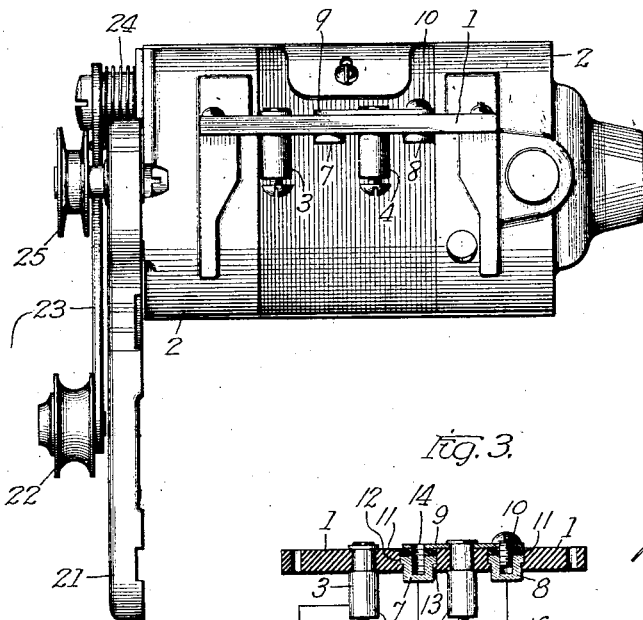
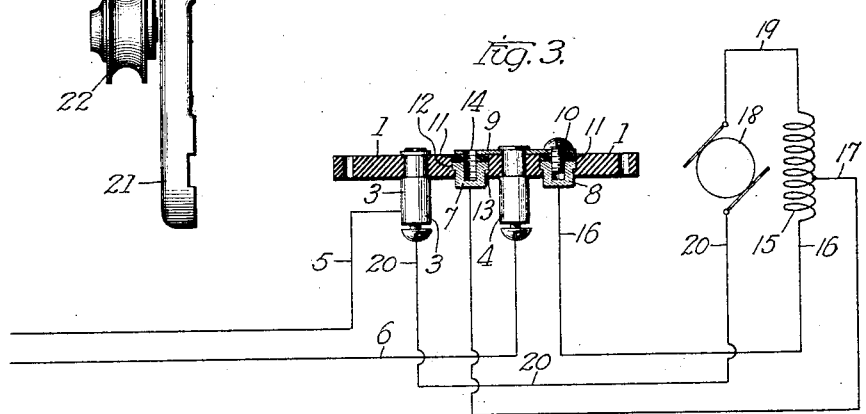
Inventor
Frederick Diehl Patented Jan. 27, 1925.

1,524,025

UNITED STATES PATENT OFFICE.

FREDERICK DIEHL, OF ELIZABETH, NEW JERSEY, ASSIGNOR, BY MESNE ASSIGNMENTS, TO THE SINGER MANUFACTURING COMPANY, OF ELIZABETHPORT, NEW JERSEY, A CORPORATION OF NEW JERSEY.

MOTOR TERMINAL BLOCK.

Application filed May 12, 1920. Serial No. 380,831.

*To all whom it may concern:*

Be it known that I, FREDERICK DIEHL, a citizen of the United States, residing at Elizabeth, in the county of Union and State of New Jersey, have invented new and useful Improvements in Motor Terminal Blocks, of which the following is a specification.

This invention relates to motor terminal block.

It is desirable that motors for certain classes of service, such, for example, as sewing machine motors, be constructed and arranged so that they may be operated by either alternating current or direct current.

Some such motors are constructed so that, without any change whatsoever, they will operate on either an alternating current or a direct current circuit. Such motors are known as Universal motors.

Other motors are constructed so that they operate on direct current, and when the relation of their armature and field windings are changed will operate on alternating current. Such motors are known as convertible motors.

The present invention has more particular relation to the latter class of motors, namely to convertible motors.

One of the objects of this invention is to provide improved means for readily converting a motor from alternating to direct current and vice versa.

Another object is to provide an improved switch for convertible motors.

Other objects and advantages will hereinafter appear.

The device comprises in general a switch or block associated with a convertible motor including a base, a plurality of terminals or sockets carried by the base and adapted to be connected with different parts of the field, a terminal plate or spanning member supported by the base between the terminals, an independent plug or connector adapted to selectively establish a connection with the plate and either terminal, whereby the relation of the field and armature are changed to permit operation selectively on either alternating or direct current, and a line terminal connected to the spanning member between the terminal sockets and constituting the sole means of holding the spanning member in place when the plug connector is removed, thereby affording a very compact and simple switch particularly adapted for use on the terminal block of a convertible sewing machine motor.

The accompanying drawings illustrate an embodiment of the invention.

In the drawings:

Fig. 1 is a side elevation of a motor with the terminal block in position.

Fig. 2 is a bottom plan of Fig. 1.

Fig. 3 is a cross section of the terminal, and a diagram of the connections.

The terminal block comprises a support or base 1 of insulating material and is secured to the dynamo frame 2 by screws or other suitable means. Line terminals 3, 4 are fixed on the base 1 and are adapted to receive the line conductors 5, 6. Terminal sockets 7, 8 are carried by the base 1 and are adjacent to, but insulated from, one of the line terminals 4. A spanning member 9 is electrically connected to the terminal 4 and extends to a point adjacent to each of the sockets 7, 8 so that an insert or plug screw 10 may be used to selectively establish an electrical connection between the line terminal 4 and one of the sockets 8. The sockets 7, 8 are separated from the spanning member 9 by insulating washers 11. The sockets are provided with a threaded aperture and annular rim 12 which engages a shoulder 13 when the socket is inserted in an opening of the support. The spanning member 9 is provided with apertures 14 in alinement with those in the sockets so that when the plug 10 is inserted, an electrical connection is established between the line terminal 4 and one of the sockets 8.

The socket 8 is connected with the winding 15 of the motor by conductor 16, and the socket 7 with another part of the winding 15 by a conductor 17. The armature 18 and field winding 15 are connected by conductor 19 and the other side of the armature is connected to the line terminal by conductor 20. The conductors 16 and 17 may be connected to the sockets 7, 8 by soldering or other means.

To use the motor on direct current, the plug screw 10 would be inserted in the socket 8 when a circuit would be established from line conductor 5, to line terminals 3, to conductor 19, through entire field winding 15, to socket 8 through plug 10 to spanning member 9, to line terminal 4 to line conductor 6.

To use the motor on alternating current the plug screw 10 would be taken from socket 8 and inserted in socket 7. The circuit would be traced the same as above to the conductor 19, and would continue from here, through a part of the winding 15, to conductor 17, to socket 7, to plug 10, to spanning member 9, to line terminal 4, to line conductor 18.

By this simple means a motor may be readily used on either alternating or direct current without requiring a change in the physical position of the conductors.

A standard convertible alternating current and direct current motor is particularly desirable for use on sewing machines, as such standard motor may be used with all machines irrespective of the character of current which is to be used. In order to change from alternating to direct current or vice versa, it is only necessary to move the plug screw from one socket to another.

As a means of supporting the motor in position on a sewing machine (not shown) a bracket 21 is provided. An idler pulley 22 is mounted on an arm 23 pivotally carried on the motor. The arm 23 is pressed by a spring 24 so that the idler pulley 22 yieldingly engages a belt guided over the driving pulley 25 of the motor.

It will be understood that the invention as defined is susceptible of various embodiments other than that selected for the purpose of explanation.

What is claimed is:

An electric switch comprising an insulating base, a pair of terminal sockets set into and spaced in rear of the plane of the front surface of said base, a spanning conductor disposed on the front surface of said base and overlying said sockets, a plug connector adapted to connect either of said sockets with said spanning conductor, and a line terminal mounted on said base intermediate said terminal sockets and connected to said spanning conductor, said line terminal constituting the sole means for holding said spanning conductor in place when said plug connector is removed.

In witness whereof, I have hereunto subscribed my name.

FREDERICK DIEHL.